United States Patent [19]

Alioto

[11] Patent Number: 5,137,430
[45] Date of Patent: Aug. 11, 1992

[54] AIR PUMP FOR BICYCLE

[76] Inventor: Kevin J. Alioto, 40 Locksly La., San Rafael, Calif. 94901

[21] Appl. No.: 680,214

[22] Filed: Apr. 4, 1991

Related U.S. Application Data

[63] Continuation-in-part of Ser. No. 497,959, Mar. 22, 1990, abandoned, which is a continuation-in-part of Ser. No. 324,148, Mar. 16, 1989, Pat. No. 5,016,894, which is a continuation of Ser. No. 199,420, May 27, 1988, Pat. No. 4,842,290.

[51] Int. Cl.$^5$ .................. F04B 17/06; F04B 41/00; F04B 21/02; C10G 19/06
[52] U.S. Cl. ................... 417/231; 417/236; 417/555.1; 280/201
[58] Field of Search ............ 417/231, 236, 313, 555.1; 280/201

[56] References Cited

U.S. PATENT DOCUMENTS

| 526,175 | 9/1894 | Barbour | 417/555.1 |
|---|---|---|---|
| 674,829 | 5/1901 | Furbow | 280/201 |
| 702,976 | 6/1902 | Lymburner | 280/201 |
| 730,074 | 6/1903 | Allen | 280/201 |
| 4,712,592 | 12/1987 | Brown | 280/201 |

Primary Examiner—Richard A. Bertsch
Assistant Examiner—Alfred Basichas
Attorney, Agent, or Firm—Townsend and Townsend

[57] ABSTRACT

An air pump which can be stored in the frame of the bicycle and can also serve as the seat post of the bicycle. The air pump has an outer, tubular post having an upper end to which a bicycle seat can be secured. A rigid tube extends partially into the post and carries a diaphragm on its inner end. The diaphragm is engageable with the inner surface of the post and compresses air in an air chamber in advance of the diaphragm when the diaphragm moves toward a closed end of the post. A flexible tube of relatively small diameter extends through a part of the rigid tube. The flexible tube has one end communicating with the air chamber and the other end is outside the rigid tube and is adapted to be coupled to a tire valve for inflating the tire. The flexible tube is of such small diameter and flexibility that no check valve is needed.

10 Claims, 2 Drawing Sheets

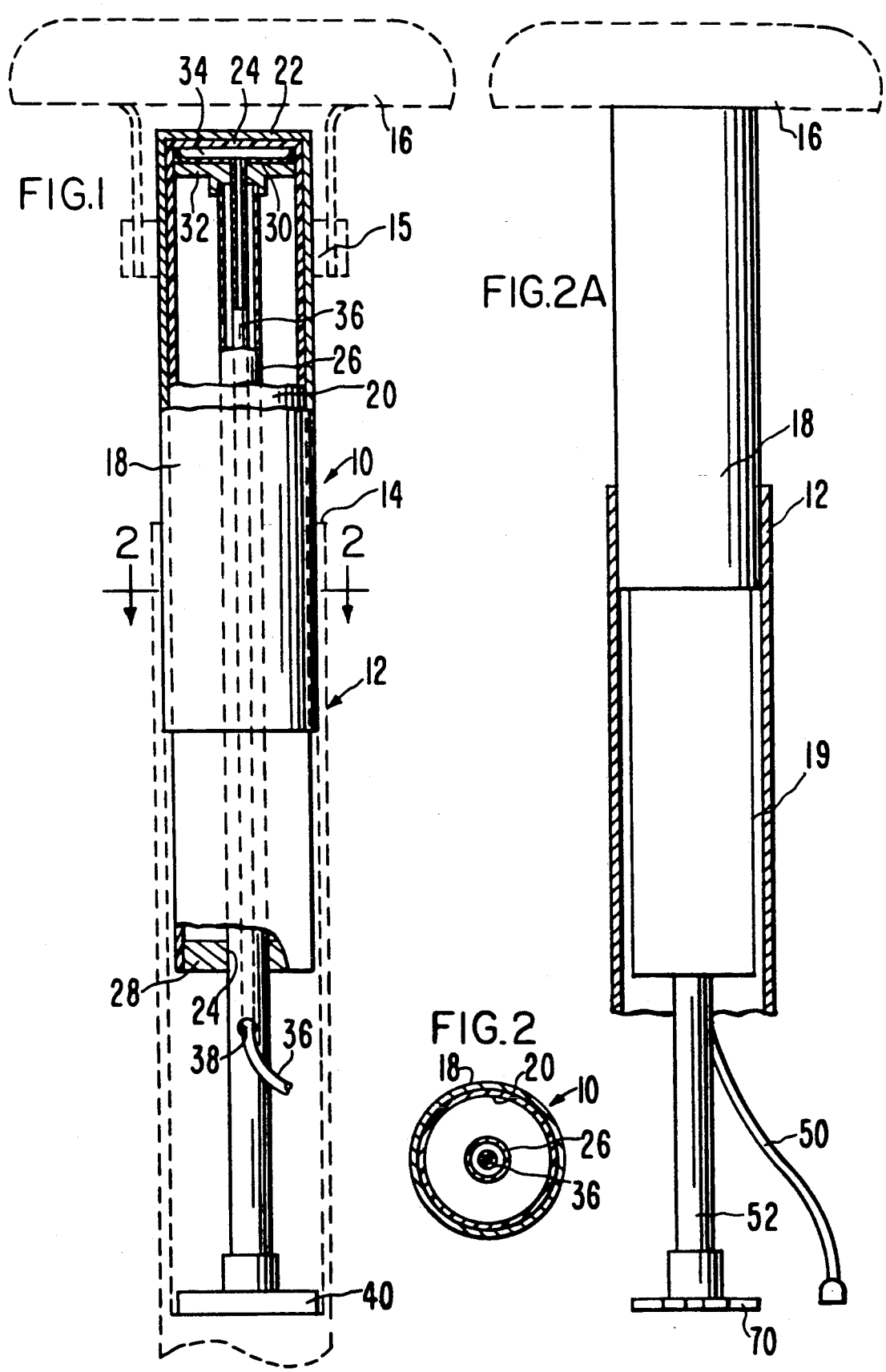

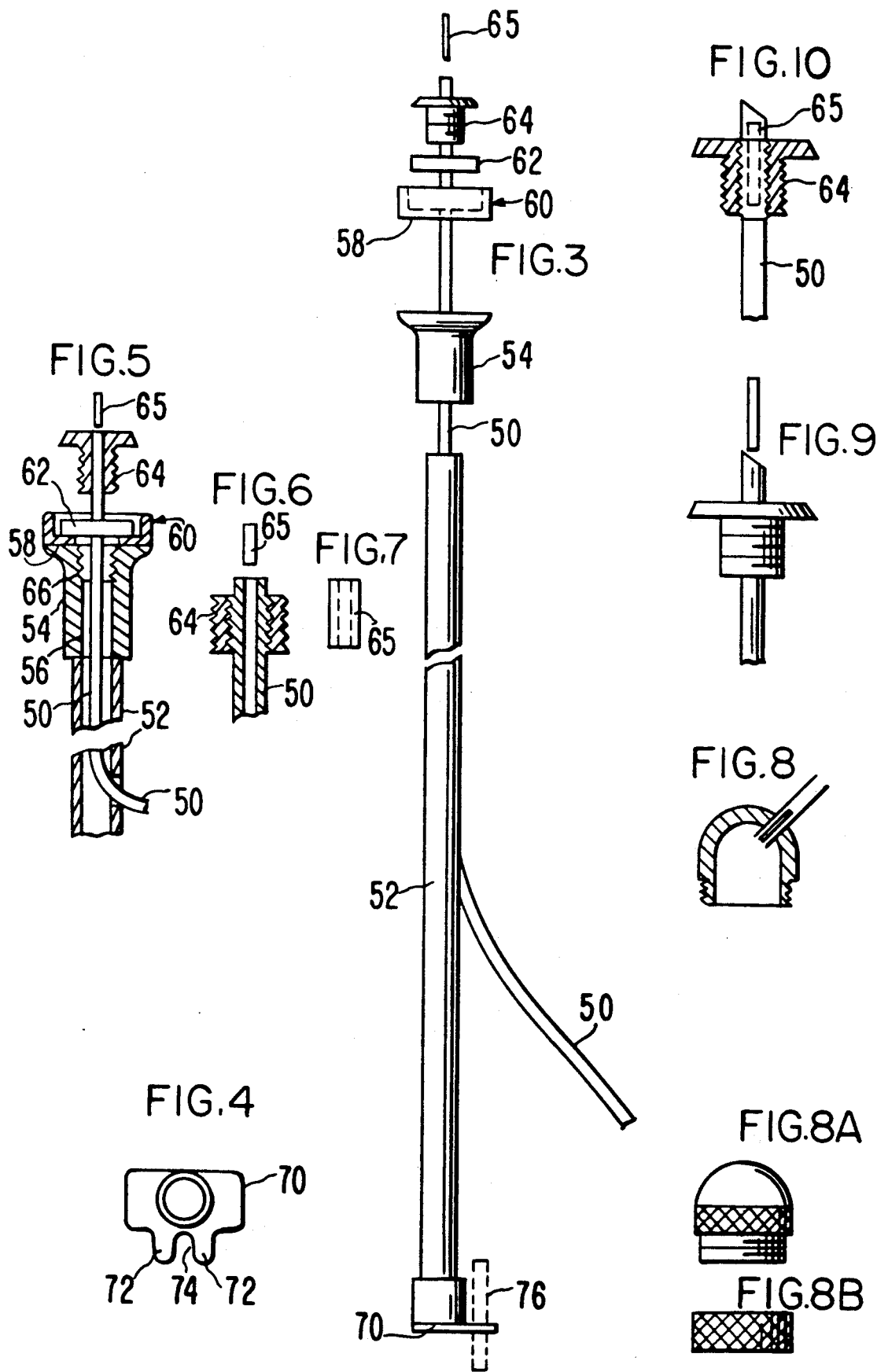

AIR PUMP FOR BICYCLE

This is a continuation-in-part patent application of U.S. Ser. No. 07/497,959, filed Mar. 22, 1990, now abandoned Apr. 5, 1991, which was a continuation-in-part application of U.S. Ser. No. 324,148, filed Mar. 16, 1989, now U.S. Pat. No. 5,016,894 which was a continuation of U.S. Ser. No. 199,420, filed May 27, 1988, now U.S. Pat. No. 4,842,290.

BACKGROUND OF THE INVENTION

This invention relates to improvements in bicycle component parts and, more particularly, to an air pump which can also serve as the post for a bicycle seat.

Air pumps carried on bicycles have been known and used in the past. Disclosures of such a concept are found in U.S. Pat. Nos. 527,607, 657,845, 702,976, 730,074, 1,270,661 and 4,712,592. For the most part, these disclosures show an air pump built into the frame of a bicycle and, while the air pumps of these disclosures are useful in certain applications, they are cumbersome to use and are expensive to produce. For this reason, a need exists for improvements in air pumps which may be carried on bicycles and the present invention satisfies this need.

SUMMARY OF THE INVENTION

The present invention is directed to an air pump which can be stored in the frame of the bicycle and also serves as the seat post of the bicycle. To this end, the air pump of the present invention has an outer, tubular post having an upper end to which a bicycle seat can be secured. The post is removably mounted in a bicycle frame in the normal fashion of a conventional seat post.

A rigid tube extends partially into the post and carries a diaphragm on its inner end. The diaphragm is engageable with the inner surface of the post and compresses air in an air chamber in advance of the diaphragm when the diaphragm moves toward a closed end of the post. A flexible tube of relatively small diameter extends through a part of the rigid tube and has one end communicating with the air chamber. The other end is outside the rigid tube and is adapted to be coupled to a tire valve for inflating the tire.

The flexible tube is of such small diameter and flexibility that no check valve is needed. This feature simplifies the air pump and minimizes its production costs.

The primary object of the present invention is to provide an improved air pump for a bicycle in which the air pump has a tubular post which serves to mount a bicycle seat on a bicycle frame yet the pump can be removed from the frame and used to inflate a tire of the bicycle while the seat remains attached to the post.

Other objects of this invention will become apparent as the following specification progresses, reference being had to the accompanying drawings for an illustration of this invention.

BRIEF DESCRIPTION OF THE DRAWINGS

FIG. 1 is a side elevational view of the air pump of the present invention, the air pump being partly broken away and in section;

FIG. 2 is a cross-sectional view taken along line 2—2 of FIG. 1;

FIG. 3 is a side elevational view, partly exploded, of the small tube enlarged to show the way in which the small tube is anchored at the upper end thereof;

FIG. 4 is a top plan view of the foot at the base of the enlarged tube of FIG. 3;

FIG. 5 is an enlarged cross-sectional, fragmentary view of a head forming part of the mount for the small tube of FIG. 3;

FIG. 6 is a view similar to FIG. 5 but showing a hex head bolt coupled to the upper end of the small tube of FIG. 3;

FIG. 7 is a side elevational view of the tubular roll pin insertable into the hose of FIG. 6 to secure the hose to the hex head bolt;

FIG. 8 is a cross-sectional view of the filler head at the outer end of the small tube of FIG. 3;

FIG. 8A is a view of the filler head of FIG. 8;

FIG. 8B is a view of the head cap used with the filler head;

FIG. 9 is a side elevational view of the hex head assembly showing the way in which the pin is inserted into the upper end of the small tube of FIG. 3; and FIG. 10 is a view similar to FIG. 9 but showing the pin in the tube.

DETAILED DESCRIPTION OF THE PREFERRED EMBODIMENT

The air pump of the present invention is broadly denoted by the numeral 10 and is adapted to be fitted into a tubular part 12 of a bicycle frame, tubular part 12 having an open top 14 and being the part normally receiving the seat post of a conventional bicycle. The air pump 10 of the present invention has means 15 for attaching a post 18 at its upper end to the seat 16 of the bicycle, such connection between the air pump and the seat being of any suitable construction.

Outer cylinder or tubular, hollow post 18 is adapted to be removably received in tubular part 12 of the bicycle frame. To this end, the outer diameter of post 18 is generally about equal to or slightly less than the inside diameter of tubular part 12. Post 18 is secured in any suitable manner to tubular part 12, such as by a threaded bolt (not shown) which, when loosened, allows post 18 to be lifted out of tubular part 12 and to be used as part of air pump 10 in a manner hereinafter described.

Post 18 typically is a conventional seat post for a bicycle. Such a post is often made relatively short and, to lengthen the post, a rigid plastic tube or inner member 20 is inserted into post 18, tube 20 being of a length greater than the length of post 18 and providing a tight fit in the post. Thus, the post can be opened at the upper end thereof although in FIG. 2, the post is shown as provided with an end wall 22.

Tube 20 also has an end wall 24 contiguous to end wall 22, tube 20 having end wall 24 adjacent to and below end wall 22. A suitable adhesive can be used to bond tube 22 to the inner surface of post 18 with the lower end of tube 20 being shown in FIG. 1.

A first rigid tube 26 is partially extended into tube 20 and projects outwardly from the lower end of tube 20. An annular guide or bearing member 28 carried in any suitable manner, such as by a set screw (not shown), is used to close the lower open end of tube 20 and to serve as a guide for tube 26 as tube 20 moves up and down on tube 26.

A flexible diaphragm 30 is mounted in any suitable manner on the upper end of tube 26. For instance, a backing plate 32 can be mounted on the tube and used beneath diaphragm 30 to support the diaphragm during upward travel of the diaphragm under the influence of tube 26. The outer peripheral margin of the diaphragm is flexible and engages the inner surface of rigid tube 20. The diaphragm forms an air chamber 34 with end wall 24 which is sealed from the atmosphere. Thus, air is compressed in the air chamber 34 when the diaphragm moves toward the top wall 24 of tube 20 during a pumping action.

During downward travel of the diaphragm, air is allowed to pass into chamber 34 past the outer peripheral margin of the diaphragm. The air enters tube 20 at the junction of guide 28 and tube 26. Guide 28 has a central hole 29 for slidably receiving tube 26.

A small diameter flexible, second tube 36 has its upper end carried by backing plate 32 as shown in FIG. 1 and the upper end of the tube 36 is open to communicate with chamber 34. The tube 36 extends downwardly through tube 20 and exits therefrom through a hole 38 below the lower end of tube 20. Tube 36 extends away from tube 26 and has an outer end (not shown) provided with means for coupling the same to a valve stem of a bicycle tire.

The inside diameter of tube 26 is in the range of 3/64" to 9/64", preferably about 3/32" so that the size of tube 36 is sufficiently small to avoid the need for a check valve associated with tube 36 in chamber 34. There is no need for a check valve because the volume of air left in tube 36 after a compression stroke is so small that, even if there is a reverse flow of air in tube 36, such air flow will not fill the air chamber 34 to its maximum extent. The material of tube 36 can be rubber, neoprene or a suitable plastic, such as a low density polyethylene.

An annular foot or projecting member 40 is mounted on the end of tube 26 so that the foot can be stepped on and held down on the ground surface during a pumping operation.

In use, the air pump 10 is taken out of the bicycle frame part 12 and the tube 36 is coupled to a bicycle tire to be inflated. The user steps on foot 40 and grasps either the outer surface of post 18 or seat 16 and causes an up and down movement of the post 18 relative to tube 26. This causes air to be compressed in chamber 34 and post 18 moves downwardly relative to tube 26 causing air to flow into and through tube 36 and into the tire to be inflated.

During lifting of the post relative to tube 26, air can flow from the atmosphere, through the junction between guide 28 and tube 26 and into chamber 34 past the outer peripheral margin of diaphragm 30. Thereafter, the post is forced downwardly again to compress air in the chamber and the compressed air flows through the small diameter tube 36 into the tire to be inflated.

The diameter of tube 36 and its flexibility are such that there is no need to use a check valve at the junction between chamber 34 and tube 36. The air merely gets trapped in the tube 36 and cannot flow back out of the tire because of the one-way check valve in the valve stem of the tire.

After the tire has been inflated, tube 36 is separated from the tire valve stem and the air pump 10 is placed back into the frame part 12 of the bicycle. The seat post 18 is adjusted as to height and locked in place once again.

FIGS. 3-7 show the way in which a hose 50 of relatively small diameter is coupled at the upper end of a tube 52 which corresponds with tube 26 of FIG. 1.

A coupling head 54 has a central hole 56 for receiving the adjacent part of tube 50, and tube 50 projects outwardly and upwardly from the open upper end of bore 56 of head 54, the tube passing through the base 58 of a diaphragm 60 having a washer 62 bearing downwardly on base 58 to force base 58 into sealing relationship with the upper flat surface of head 54. A hollow hex head bolt 64 is externally threaded for threadable attachment in threaded portion 66 of head 54. Thus, the bolt 64 forces washer 62 and base 58 of diaphragm 60 into sealing relationship with the upper flat surface of head 54.

Bolt 64 has an internally threaded bore which is wrapped on the upper end of the resilient material of hose 50 to threadably couple the hose to bolt 64 by making threads on the hose. A hollow roll pin 65 is forced into the open upper end of hose 50 and the pin is oversized compared with the inside diameter of the hose so that the hose is stretched to make a tight fit between the hose and bolt 64.

The foot 70 of tube 52 is shown in FIG. 4 has a pair of projections 72 defining a slot 74 for receiving the stowed portion 76 (FIG. 3) of hose 50 when tube 52 is inserted into the bicycle frame along with the seat post. Pads 78 are provided on foot 70 for engagement by the feet to stabilize the bottom of tube 52 when the system is in operation.

FIG. 2A shows a seat post 18 in a frame 12 of a bicycle. The major portion of the seat post, identified as numeral 19 in FIG. 2A is turned down to minimize the weight and to allow the stroke of the pump to be increased to about 12" from about 7". By turning down the portion 19 of the seat post, a weight savings of about 60 grams of a 120 gram seat post can be realized.

The threaded portion of the hollow hex head bolt 64 provides a grip on hose 50. Also, the threaded portion of the hose 50, which is about 3/16" in diameter, is capable of fitting into a smaller hole, such as a 5/32" hole. As the hose enters the center bore of bolt 64, a clockwise turning motion will engage the hose with the threads on the inner bore of bolt 64. This will draw the hose into the bore. A split end helps to start the process and can be clipped flush with the pin. The thread size has been chosen as a metric 5×0.8.

After the pin has been inserted into the hose 50 past the split end of the hose, a counterclockwise rotation of the hose will draw the portion of the hose containing the pin into the threaded hole.

A filler head is shown in FIGS. 8 and 8A. The filler head has a hole with the same threaded inner surface as hex bolt 64. The filler head is used at the outer end of hose 50. A head cap with an o-ring seal is used with the filler head.

I claim:

1. An air pump for a bicycle having a tubular frame part for normally receiving a seat post comprising:
    a hollow post removably receivable in the frame part of the bicycle, said post having a closed upper end;
    a first tube partially extending into the post through the lower end thereof;
    a diaphragm secured to the inner end of the first tube and in sliding engagement with the inner surface of the post to form an air chamber in the post near the upper end thereof; and
    a second tube extending partially through the first tube and in fluid communication with the air chamber for connecting the air chamber with a device to be inflated, said second tube having an inner diameter less than the inner diameter of the first tube.

2. Apparatus as set forth in claim 1, wherein said post has a bearing member at the opposite end thereof, said bearing member having a central hole, said first tube being slidably received in the central hole of the bearing member.

3. An air pump as set forth in claim 1, wherein the first tube has a projecting member on the outer end thereof, said projecting member adapted to be held against a surface as the post reciprocates relative to the first tube.

4. An air pump as set forth in claim 1, wherein the first tube is rigid and the second tube is flexible.

5. An air pump as set forth in claim 4, wherein the first tube has a side hole therethrough near the end remote from the air chamber, said second tube extending through the side hole.

6. An air pump as set forth in claim 1, wherein the second tube is flexible and has an inner diameter in the range of 3/64" to 9/64".

7. An air pump as set forth in claim 1, wherein the inner diameter of the second tube is approximately 3/32".

8. An air pump as set forth in claim 1, wherein the material of the second tube is low density polyethylene.

9. An air pump as set forth in claim 1, wherein said post includes an outer member and an inner member, the inner member being bonded to the outer member and having a length greater than the outer member.

10. An air pump as set forth in claim 9, wherein the inner member has an end wall closing the upper end of the inner member, said end wall forming one boundary of the air chamber.

* * * * *